United States Patent
Sayn-Urpar et al.

(10) Patent No.: US 10,532,802 B2
(45) Date of Patent: Jan. 14, 2020

(54) PROPULSION ASSEMBLY COMPRISING A BOX FOR RETAINING DRAINED FLUIDS

(71) Applicant: SNECMA, Paris (FR)

(72) Inventors: Julien Sayn-Urpar, Moissy-Cramayel (FR); Hervé Jean Albert Mouton, Moissy-Cramayel (FR); Julien Pavillet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 453 days.

(21) Appl. No.: 15/100,619

(22) PCT Filed: Nov. 25, 2014

(86) PCT No.: PCT/FR2014/053028
§ 371 (c)(1),
(2) Date: May 31, 2016

(87) PCT Pub. No.: WO2015/082799
PCT Pub. Date: Jun. 11, 2015

(65) Prior Publication Data
US 2016/0304184 A1    Oct. 20, 2016

(30) Foreign Application Priority Data

Dec. 4, 2013  (FR) .................... 13 62076

(51) Int. Cl.
*B64C 1/14* (2006.01)
*B64D 29/00* (2006.01)
(Continued)

(52) U.S. Cl.
CPC ............ *B64C 1/1453* (2013.01); *B64D 29/00* (2013.01); *F01D 25/24* (2013.01); *F01D 25/28* (2013.01);
(Continued)

(58) Field of Classification Search
CPC ...... B64C 1/1453; B64D 27/12; B64D 27/18; B64D 2027/262; B64D 29/00;
(Continued)

(56) References Cited

U.S. PATENT DOCUMENTS 4,275,603 A * 6/1981 Kalocsay ............... G01P 5/165
165/104.26
5,104,069 A   4/1992 Reising
(Continued)

FOREIGN PATENT DOCUMENTS

FR    2907099 A1 *  4/2008  ........... B64C 1/1453
FR    2 910 888 A1   7/2008
GB    2 446 147 A    8/2008

OTHER PUBLICATIONS

Written Opinion of the International Searching Authority dated Mar. 9, 2015, issued in corresponding International Application No. PCT/FR2014/053028, filed Nov. 25, 2014, 6 pages.
(Continued)

*Primary Examiner* — Woody A Lee, Jr.
*Assistant Examiner* — Christopher R Legendre
(74) *Attorney, Agent, or Firm* — Christensen O'Connor Johnson Kindness PLLC

(57) ABSTRACT

A propulsion assembly includes an engine surrounded by a nacelle, structure for draining the fluids from the engine and structure for guiding said fluids to a retention box. The retention box is arranged outside the engine and has a cavity for storing drained fluids. The retention box is fixed to a cowling of the nacelle and supported thereby.

9 Claims, 2 Drawing Sheets

(51) Int. Cl.
*F01D 25/24* (2006.01)
*F01D 25/28* (2006.01)
*F01D 25/32* (2006.01)

(52) U.S. Cl.
CPC ........ *F01D 25/32* (2013.01); *F05D 2260/602* (2013.01)

(58) Field of Classification Search
CPC ......... B64D 29/02; B64D 29/06; F01D 25/32; F05D 2260/202
See application file for complete search history.

(56) References Cited

U.S. PATENT DOCUMENTS

| | | | |
|---|---|---|---|
| 5,285,636 A | 2/1994 | Mayo et al. | |
| 5,552,576 A * | 9/1996 | Giamati | B64C 1/1453 219/201 |
| 6,227,485 B1 * | 5/2001 | Porte | B64D 29/08 244/53 B |
| 6,435,452 B1 * | 8/2002 | Jones | B64C 1/1453 244/1 A |
| 6,578,361 B1 * | 6/2003 | Higginbotham | F01D 5/005 60/39.094 |
| 7,651,055 B2 * | 1/2010 | Turner | B64C 1/1453 244/129.1 |
| 7,731,127 B2 * | 6/2010 | Hoffjann | F16L 5/08 244/136 |
| 8,328,504 B2 * | 12/2012 | Russell | B64D 29/00 244/129.1 |
| 10,017,238 B2 * | 7/2018 | Leon | B64C 1/1453 |
| 2005/0230547 A1 * | 10/2005 | Giamati | B64C 1/1453 244/129.1 |
| 2011/0121137 A1 * | 5/2011 | Sandiford | B64C 1/1453 244/136 |
| 2016/0304184 A1 * | 10/2016 | Sayn-Urpar | B64C 1/1453 |

OTHER PUBLICATIONS

International Preliminary Report on Patentability dated Jun. 7, 2016, issued in corresponding International Application No. PCT/FR2014/053028, filed Nov. 25, 2014, 1 page.

International Search Report dated Mar. 9, 2015, issued in corresponding International Application No. PCT/FR2014/053028, filed Nov. 25, 2014, 6 pages.

Written Opinion dated Mar. 9, 2015, issued in corresponding International Application No. PCT/FR2014/053028, filed Nov. 25, 2014, 5 pages.

* cited by examiner

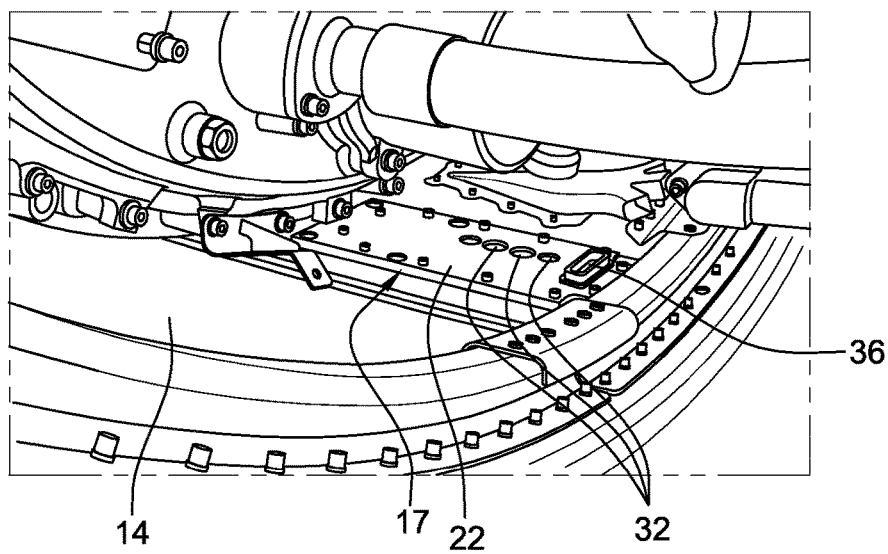
Fig. 3
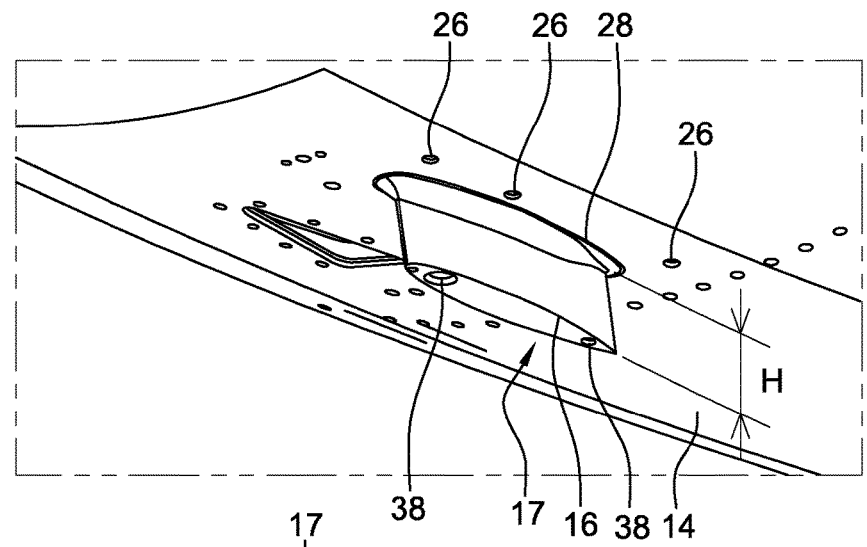
Fig. 4
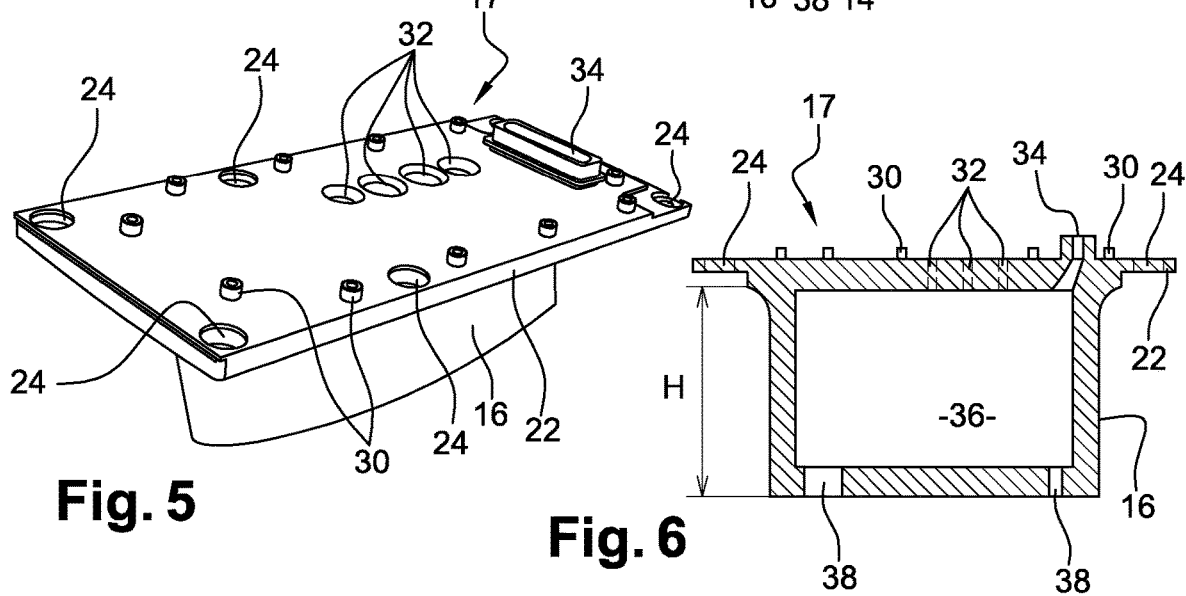
Fig. 5
Fig. 6

PROPULSION ASSEMBLY COMPRISING A BOX FOR RETAINING DRAINED FLUIDS

TECHNICAL FIELD

The present invention relates to a propulsion assembly comprising a box for retaining drained liquids, these liquids being, for example, oil, water and/or fuel.

PRIOR ART

The prior art includes the document U.S. Pat. No. 5,285,636.

An aeroplane propulsion assembly generally has means for draining liquids (oil, water and/or fuel) from the engine to prevent these liquids from collecting and disrupting the operation of the engine. The oil and fuel are drained owing to the fact that the dynamic seal technologies (pumps, AGBs, chokes, actuators, etc.) do not allow for perfect sealing. Therefore, the liquids that pass through the dynamic seals have to be drained to prevent them leaking into the engine. The water is drained to prevent water-retention areas, which often lead to corrosion.

In the current state of the art, the drained liquids can be evacuated directly to the outside. The means for draining the liquids from the engine can also be connected by conveying means, such as ducts, to a retaining box comprising a cavity for storing the drained liquids. This retaining box is located within the propulsion assembly. It is attached to the engine and is generally located in the lower portion of the propulsion assembly so that the drained liquids flow into the conveying means and into the storage cavity as a result of gravity.

The propulsion assembly further comprises a drainage mast for discharging the drained liquids to the outside. This mast is supported by the nacelle and protrudes towards the outside of the nacelle. Said mast is also located in the lower portion of the propulsion assembly, facing the retaining box, and collects liquids exiting the box. The mast comprises a lower end comprising an opening for discharging the liquids to the outside of the nacelle. When the storage cavity in the retaining box is emptied, the liquids are discharged as far as to the opening in the mast and then discharged to the outside of the propulsion assembly.

In some propulsion assemblies, the opening kinematics of the cowls does not give manual access to the retaining box, nor does it allow for a leak-tight hydraulic connection between the conveying means and said box. It would be conceivable to not equip said propulsion assemblies with a retaining box, in which case the outlets of said conveying means would open directly opposite the mast and would dispense the drained liquids in the region of the mast as soon as said liquids are collected. However, some aircraft manufacturers want their propulsion assemblies to have boxes for retaining the drained liquids, in particular in order to have better control over the time at which said liquids are discharged to the outside.

The present invention proposes a simple, effective and economical solution to this problem.

SUMMARY OF THE INVENTION

The invention proposes a propulsion assembly comprising an engine surrounded by a nacelle, means for draining liquids from the engine and means for conveying said liquids to a retaining box outside the engine, the retaining box comprising a mast having an aerodynamic profile which comprises an internal cavity for storing the liquids and at least one opening for discharging the liquids held in the cavity, characterised in that this retaining box is attached to a cowl of the nacelle and is supported thereby, and comprises, at one end of the mast, an attachment plate comprising means for attachment to the cowl of the nacelle and connection means that interact with said liquid conveying means.

According to the invention, the retaining box is no longer carried by the engine, but is instead carried by the nacelle of the propulsion assembly. The retaining box thus takes up less space, and it is conceivable for said discharge mast to be rigidly connected to and integral with the box such that at least one portion of the cavity for storing the drained fluids can be housed within the mast. This invention is particularly, but not exclusively, suitable for turbine engines having less space between the nacelle and the engine.

The mast preferably has a radial dimension which is such that the liquids are discharged outside of the boundary layer located on the outer surface of the nacelle during flight. In other words, the radial dimension of the profiled portion of the mast is preferably greater than the thickness of this boundary layer.

The retaining box can be attached by its plate to a fixed or removable cowl of the nacelle.

The plate can be covered by a heat protection sheet.

The retaining box is always located at 6 o'clock in terms of the dial of a clock.

The present invention also relates to a box for retaining drained liquids for a propulsion assembly as described above, the retaining box comprising a mast having an aerodynamic profile, said mast comprising an internal cavity for storing the liquids and at least one opening for discharging the liquids held in the cavity, characterised in that it comprises, at one end of the mast, an attachment plate comprising means for attachment to a nacelle cowl of said propulsion assembly and connection means for interacting with means for conveying drained liquids.

DESCRIPTION OF THE DRAWINGS

The invention will be better understood and other details, features and advantages of the invention will become more apparent upon reading the following description given by way of non-limiting example and with reference to the accompanying drawings, in which:

FIG. 3 is another schematic perspective view of part of the propulsion assembly of FIG. 1;

FIGS. 4 and 5 are schematic perspective views of the discharge mast according to the invention; and FIG. 6 is a schematic axial cross section of the discharge mast according to the invention.

DETAILED DESCRIPTION

Figure 1:
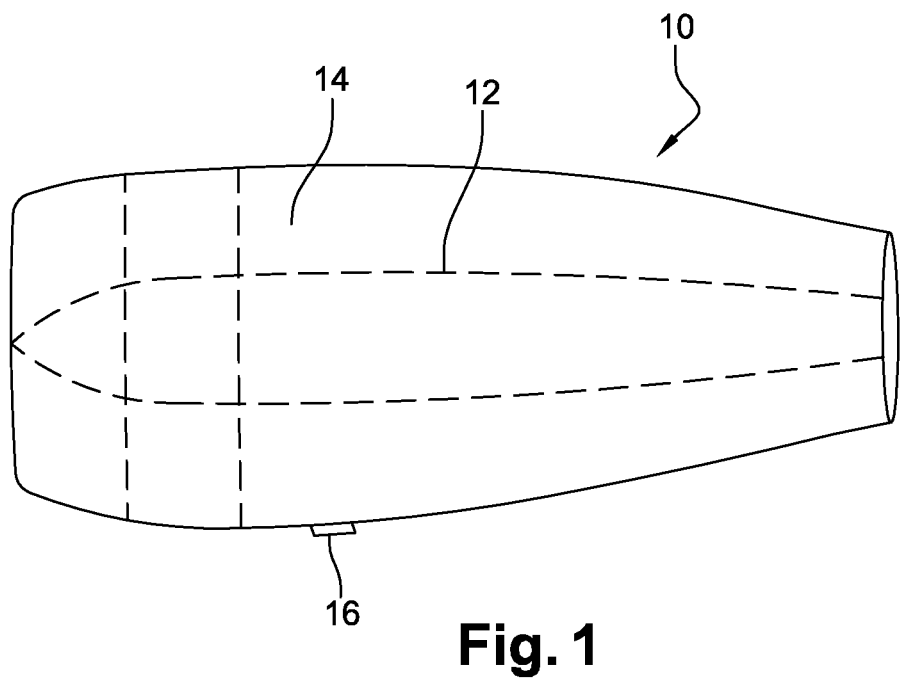
FIG. 1 is a schematic perspective view of an aircraft propulsion assembly according to the invention.
Figure 2:
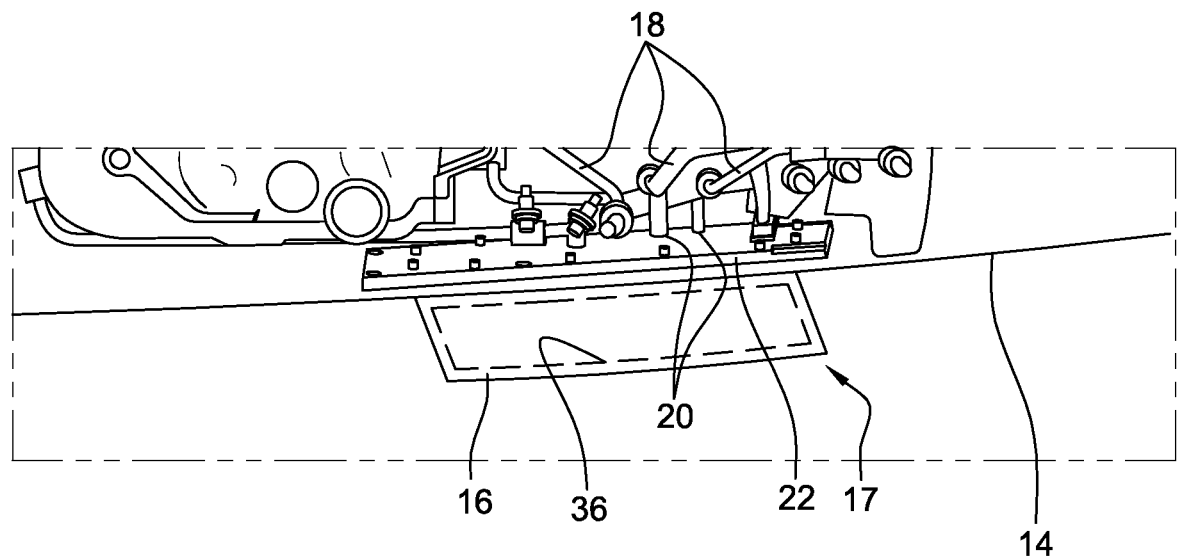
FIG. 2 is a schematic enlarged view in perspective and in axial section of part of the propulsion assembly of FIG. 1.

Reference is first made to FIG. 1, which shows an aircraft propulsion assembly 10 comprising an engine 12 (such as a bypass turbojet engine, shown schematically by dashed lines) fitted inside a nacelle 14.

The engine 12 comprises, from upstream to downstream in the direction of flow of the gases (from left to right in the drawing), a fan, a compressor, a combustion chamber, a turbine, and an exhaust nozzle for ejecting the combustion gases. The nacelle 14 comprises an air inlet, cowls and an inverter, the cowls defining the outer surface of the propulsion assembly.

The propulsion assembly 10 comprises a mast 16 for discharging drained liquids, said mast being oriented substantially radially and protruding on the outer surface of the nacelle. Said mast is located in the lower portion of the propulsion assembly, at 6 o'clock in terms of the dial of a clock.

Many types of liquid flow into the propulsion assembly 10, in particular fuel, oil for lubricating the bearings of the rotating parts, and water, which can be drawn in by the ventilation scoops or formed by the condensation on the engine.

During operation, said liquids are drained so that they do not collect and disrupt the operation of the propulsion assembly. The propulsion assembly comprises means for draining said liquids (such as drainage tubes), which are connected to a box for retaining said liquids by means for conveying liquids, such as ducts. According to the invention, said retaining box is carried by the nacelle 14 of the propulsion assembly.

FIG. 2 to FIG. 6 show an embodiment of the retaining box 17, which comprises the discharge mast 16 and a plate 22 for attachment to the nacelle 14 positioned at an inboard end of the discharge mast 16.

In the example shown, the plate 22 has a substantially parallelepiped shape and is attached to cowls of the nacelle 14. Said plate comprises openings 24 which are aligned with openings 26 in the nacelle for passing through nut and bolt-type means. The mast 16 has an aerodynamic profile and passes through a radial opening 28 in the nacelle. The retaining box 17 is fitted in this opening by being radially translated from the inside of the nacelle until the plate 22 abuts the inner surface of the nacelle. A seal can be provided and intended to be compressed between the plate and the nacelle.

The plate 22 further comprises studs 30 for attaching a heat protection shield (not shown) and means 32, 34 for connecting the outlets 20 of the ducts 18 for conveying the drained fluids.

These connection means firstly comprise channels 32, 34 in which the outlet ducts 18 are fitted, the radially outer ends of said channels 32, 34 opening onto the radially outer surface of the plate 22. The channels 32 (four in the example shown) have a circular cross section and their radially outer outlets form openings that are aligned one behind the other, the peripheral edges of these openings being chamfered or having a rounded convex cross section. One duct 18 is designed to be fitted in each of said openings.

The channel 34 has an elongate cross section and its radially outer outlet forms a clearance for receiving at least two other ducts 18. The radially external end of said channel 34 forms a radially outer pipe, which protrudes on the radially outer surface of the plate 22.

The radially inner ends of the channels 32, 34 are in fluid communication with the inner cavity 36 of the retaining box 17, which is in turn in fluid communication with one or more channels 38 for discharging the liquids (FIG. 6), each of these channels 38 being able to have means for the controlled release of the liquids.

In this case, there are two channels 38 and they are formed on the radially outer end portion of the mast. Their radially outer outlets form two circular openings, which are located upstream and downstream of the mast 16, respectively.

The profiled portion of the mast 16, which protrudes on the outer surface of the nacelle, has a height H or a radial dimension that is greater than the thickness of the boundary layer on the nacelle during operation, such that the liquids discharged from the cavity 36 are ejected by the channels 38 outside of said boundary layer.

The invention claimed is:

1. A propulsion assembly, comprising:
an engine surrounded by a nacelle;
means for draining liquids from the engine; and
means for conveying said liquids to a retaining box outside the engine, the retaining box comprising a mast having an aerodynamic profile which comprises an internal cavity for storing the liquids and at least one opening for discharging the liquids held in the cavity,
wherein the retaining box is attached to a cowl of the nacelle and is supported thereby, the cowl being removable for access to the engine and defining an outer surface of the propulsion assembly, and
wherein the retaining box comprises, at one end of the mast, an attachment plate comprising means for attachment to the cowl of the nacelle and connection means that interact with means for conveying said liquids,
wherein said means for conveying said liquids comprise ducts each having an outlet, and said connection means comprising channels, each channel opening both on a radially inner surface of the attachment plate and into the internal cavity for storing the liquids, the outlet of each duct being fitted in one of the channels.

2. The propulsion assembly according to claim 1, wherein the plate is covered with a heat protection sheet.

3. The propulsion assembly according to claim 1, wherein the retaining box is located at a lowest circumferential position on the nacelle.

4. The propulsion assembly according to claim 1, wherein the attachment plate abuts a radially inner face of the cowl.

5. The propulsion assembly according to claim 1, wherein a seal is located between the attachment plate and the cowl.

6. A propulsion assembly, comprising:
an engine surrounded by a nacelle;
a retaining box disposed outside of said engine and carried by the nacelle, the retaining box comprising a drainage mast having an aerodynamic profile, the drainage mast comprising an internal cavity for collection and storage of liquids from said engine, the drainage mast further comprising an attachment plate at one end thereof and at least one opening for discharging liquids held in the internal cavity;
a plurality of ducts, each duct having an outlet arranged to supply said liquids to the retaining box;
a plurality of channels, each channel having a first opening that opens to a radially inner surface of the attachment plate and a second opening that opens into the internal cavity,
wherein the outlets of said ducts are connected in fluid communication with said first openings of said channels, respectively.

7. The propulsion assembly according to claim 6, wherein the nacelle comprises a cowl defining an outer surface of the propulsion assembly, and wherein the drainage mast protrudes outwardly away from said outer surface of said cowl.

8. The propulsion assembly according to claim 7, wherein the attachment plate includes at least one attachment interface configured for coupling with said cowl.

9. The propulsion assembly according to claim 7, wherein the retaining box is located at a lowest circumferential position on the nacelle.

* * * * *